M. C. DART.
CLOSURE MEMBER FOR AUTOMOBILE HOODS.
APPLICATION FILED JAN. 19, 1921.
1,434,487.
Patented Nov. 7, 1922.
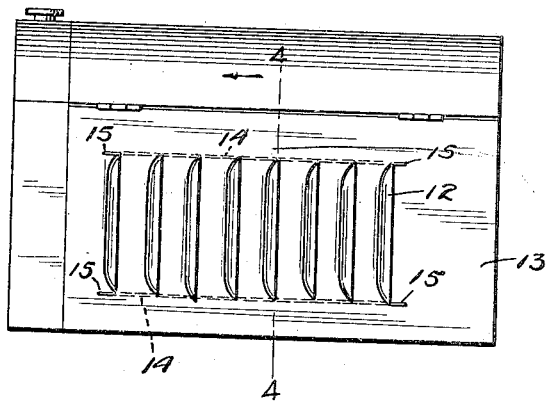
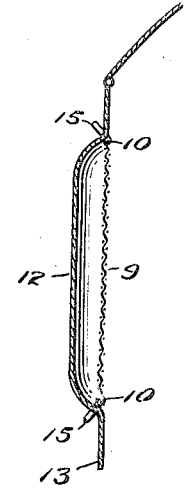
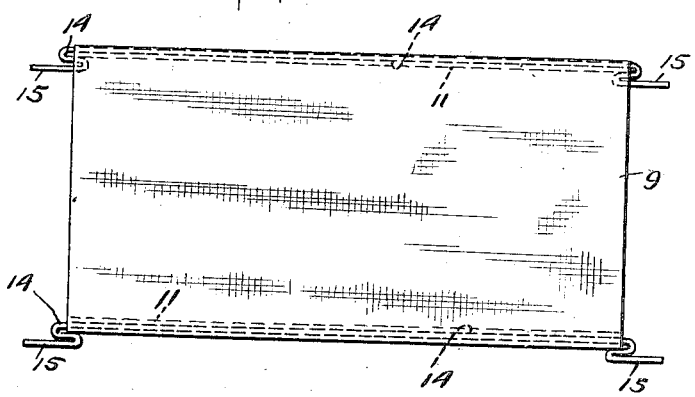
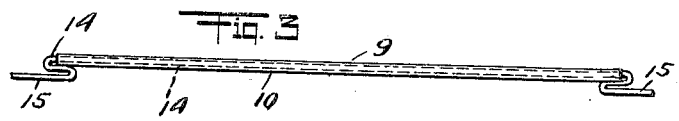
INVENTOR
M. C. DART Patented Nov. 7, 1922.

1,434,487

UNITED STATES PATENT OFFICE.

MELVIN CURTISS DART, OF NEW YORK, N. Y.

CLOSURE MEMBER FOR AUTOMOBILE HOODS.

Application filed January 19, 1921. Serial No. 438,301.

*To all whom it may concern:*

Be it known that I, MELVIN C. DART, a citizen of the United States, and a resident of New York city, in the county of Bronx and State of New York, have invented certain new and useful Improvements in Closure Members for Automobile Hoods, of which the following is a full, clear, and exact description.

Among the principal objects which the present invention has in view are: to retard the escape of heated air from under the hood of an automobile; to provide universal closure members for the side openings of automobile engine hoods; and to quickly and easily install and remove said closure members.

*Drawings.*

Figure 1 is a side view of an automobile engine hood and radiator showing in conjunction therewith, a closure member constructed and arranged in accordance with the present invention.

Figure 2 is a side view of a closure member.

Figure 3 is an edge view of the same.

Figure 4 is a sectional view on enlarged scale, the section being taken as on the line 4—4 in Fig. 1.

*Description.*

As seen in the drawings a closure member 9 is preferably constructed of fabric and is provided with open-ended channels formed by folding back the edges 10 of the member 9 and holding the edges in this position by a line of stitching 11. The member 9 is especially adapted for employment enclosing the inner openings formed by the louvres 12 on automobile engine hoods 13 which are provided for the ventilation of the space under the said hood during the hot or summer weather. During the cold or winter weather it is desired to conserve the heat so as to prevent the cooling of the engine during periods of inactivity or waiting and also for the purpose of preventing the escape of the heated air under the hood during the active periods which, then moving backward under the dashboard and seat occupied by the driver, serves to warm the body of the car. Also by retaining the heat under the hood, the operation of the engine, and particularly of the carburetor associated therewith, is improved.

The closure member 9 is supported by resilient bars 14 which extend through the channels formed by the overturned edges 10. At both ends the bars are bent to form the hooks 15. The hooks 15 are so constructed and arranged that they will extend over the metal of the hood 13 where the louvres are turned outward from the body of the metal forming the hood, or in other words, at the junction of the ends of the louvres with the flat metal of the hood, as can be seen best in Figures 1 and 4 of the drawings.

Where the length of the space incorporating the louvres 12 is shorter than the member 9, the effective length of the member is shortened or varied by bending the bars 14 intermediate the ends thereof to form a vertical fold or plait in the closure member 9 to permit the hooks 15 to properly engage the louvres. Also it will be seen that by means of this construction the effective length of the closure member 9 may be varied to permit its employment with the louvres 12 in such manner as to expose a limited number of the louvre-openings where it is sought to modify full effectiveness of the member 9 or to partially cool the interior of the cover of the hood 13.

While I have herein disclosed the bars 14 as a means for hanging the member 9 it will be understood that I do not desire to limit myself to such construction, as it is obvious that the member 9 may be attached to the hood 13 by other and well known means all of which is thought to be comprised within the scope of the present invention. Also it will be understood that while I have described only one of the closure members 9, all hoods will be equipped with at least two of the said closure members, these louvres being usually provided on the opposite sides of the hoods 13.

*Claim.*

The combination with an automobile engine hood having ventilating openings therein; of a plurality of closure members adapted to cover said openings; means for detachably mounting said members on said hood, said means embodying a plurality of supporting rods; and means for attaching the ends of said rods to said hood, said last mentioned means embodying hooks formed at the ends of said rods, said hooks being adapted for engaging the structure of said hood at the corners of said openings therein.

MELVIN CURTISS DART.